United States Patent
Lundblad et al.

(10) Patent No.: US 8,173,326 B2
(45) Date of Patent: May 8, 2012

(54) ELECTROCHEMICAL DEVICE

(75) Inventors: Anders Lundblad, Stockholm (SE);
Frederic Jaouen, Montreal (CA);
Sjoerd Haasl, Gothenburg (SE); Wouter Van Der Wijngaart, Stockholm (SE)

(73) Assignee: my FC AB, Stockholm (SE)

( * ) Notice: Subject to any disclaimer, the term of this patent is extended or adjusted under 35 U.S.C. 154(b) by 1123 days.

(21) Appl. No.: 11/665,012

(22) PCT Filed: Oct. 12, 2005

(86) PCT No.: PCT/SE2005/001514
§ 371 (c)(1),
(2), (4) Date: Jun. 4, 2007

(87) PCT Pub. No.: WO2006/041397
PCT Pub. Date: Apr. 20, 2006

(65) Prior Publication Data
US 2008/0096075 A1    Apr. 24, 2008

(30) Foreign Application Priority Data
Oct. 12, 2004   (SE) .................................. 0402471

(51) Int. Cl.
*H01M 2/08*    (2006.01)
*H01M 4/64*    (2006.01)
*H01M 8/00*    (2006.01)
*H01M 4/02*    (2006.01)

(52) U.S. Cl. ........ 429/508; 429/507; 429/517; 429/535; 429/534; 429/523

(58) Field of Classification Search .................. 429/508, 429/507, 517, 535, 534, 523
See application file for complete search history.

(56) References Cited

U.S. PATENT DOCUMENTS

| | | | |
|---|---|---|---|
| 5,242,764 A | 9/1993 | Dhar | |
| 5,925,477 A | 7/1999 | Ledjeff et al. | |
| 5,945,232 A | 8/1999 | Ernst et al. | |
| 6,080,503 A * | 6/2000 | Schmid et al. | 429/483 |
| 6,387,557 B1 | 5/2002 | Krasij et al. | |
| 2002/0022170 A1* | 2/2002 | Franklin et al. | 429/34 |
| 2004/0048132 A1 | 3/2004 | Takai et al. | |
| 2004/0053099 A1* | 3/2004 | Franklin et al. | 429/30 |

(Continued)

FOREIGN PATENT DOCUMENTS

EP    1369948 A1    12/2003

(Continued)

OTHER PUBLICATIONS

Supplementary European Search Report in Corresponding Application EP 05792439 Dated Feb. 15, 2010.

(Continued)

*Primary Examiner* — Helen O Conley
(74) *Attorney, Agent, or Firm* — Young & Thompson

(57) ABSTRACT

A polymer electrolyte electrochemical device includes an anode current collector (1), a membrane electrode assembly (2) with anode and cathode gas backings (3, 4), and a cathode current collector (5), wherein the membrane electrode assembly is sealed and attached at least to the anode current collector by adhesive elements, thereby creating an anode gas chamber, and optionally attached to the cathode current collector by adhesive elements, the adhesive elements being electrically conducting or electrically non-conducting. The invention also relates to polymer electrolyte electrochemical device components adapted for use in a single cell electrochemical device and a series arrangement electrochemical device.

11 Claims, 7 Drawing Sheets

U.S. PATENT DOCUMENTS

2004/0161655 A1     8/2004    Murphy et al.
2005/0026028 A1*   2/2005    Ouchi et al. .................... 429/38

FOREIGN PATENT DOCUMENTS

| | | |
|---|---|---|
| GB | 2323700 A | 9/1989 |
| JP | 20 02056863 | 2/2002 |
| JP | 2002-56855 A | 2/2002 |
| JP | 2002-56863 A | 2/2002 |
| JP | 2003-272662 A | 9/2003 |
| JP | 20 04006419 | 1/2004 |
| JP | 20 04214045 | 7/2004 |
| WO | 96/23323 A1 | 8/1996 |
| WO | 0067336 | 11/2000 |
| WO | 0219451 | 3/2002 |

OTHER PUBLICATIONS

Japanese Office Action, dated Jan. 5, 2012, from corresponding Japanese application.

* cited by examiner

ELECTROCHEMICAL DEVICE

TECHNICAL FIELD

The present invention relates to a polymer electrolyte electrochemical device and to electrochemical device components for use in a planar configuration air breathing polymer electrolyte electrochemical devices. The electrochemical device may be use as a fuel cell or an electrolyser.

BACKGROUND

Generally, a fuel cell is a device which converts the energy of a chemical reaction into electricity. Fuel cells differ from batteries in that fuel and oxidant are stored external to the cell, which can generate power as long as the fuel and oxidant are supplied. A fuel cell produces an electromotive force by bringing the fuel and oxidant in contact with two suitable electrodes separated by an electrolyte. An electrolyser is a device with the opposite function of a fuel cell. It converts electrical energy to chemical energy in the form of hydrogen and oxygen. In a polymer electrolyte fuel cell, a fuel such as hydrogen gas, is introduced at one electrode where it dissociates on the electrocatalytic surface of the negative electrode (anode) to form protons and electrons, as elucidated in equation 1. The electrons pass into the conductive structure of the electrode, and there from to the external electrical circuit energized by said fuel cell. The protons formed by dissociation of the hydrogen at the first electrode pass through the electrolyte to the second electrode. Simultaneously, an oxidant, such as oxygen gas or air, is introduced to the second electrode where it is adsorbed on the electrocatalytic surface of the negative electrode (cathode) and is electrochemically reduced to form a surface oxide species by electrons having transversed the external electrical circuit energized by the fuel cell. This surface oxide reacts with protons from the electrolyte to form water, the product of the net reaction. The water desorbs from the electrode and leaves the cell in the cathode. Some of the formed water, being in condensed form, remain in the cathode and the hygroscopic membrane. The half cell reactions for a hydrogen consuming fuel cell at the two electrodes are, respectively, as follows:

   (1);

   (2)

Connecting the two electrodes through an external circuit causes an electrical current to flow in the circuit and withdraws electrical power from the cell. The overall fuel cell reaction, which is the sum of the separate half cell reactions written above, produces electrical energy and heat.

Although some applications may make use of a single cell, fuel cells are in practice often connected in a series to additively combine the individual cell potentials and achieve a greater, and more useful, potential. The cells in a given series can be connected directly, with opposing faces of a single component in contact with the anode of one cell and the cathode of an adjacent cell, or through an external electrical linkage. A series of fuel cells, referred to as a fuel cell stack, are normally equipped with a manifold system for the distribution of two gases. The fuel and oxidant are directed with manifolds to the correct electrodes, and cooling is provided either by the reactants or by a cooling medium. Also within the stack are current collectors, cell-to-cell seals, and other components. The stack and associated hardware make up the fuel cell module.

In fuel cells which use a solid polymer electrolyte, the membrane acts as the electrolyte as well as a barrier for preventing the mixing of the reactant gases. A PEM fuel cell is described in greater detail in Dhar, U.S. Pat. No. 5,242,764, which is incorporated herein by reference. Much research and development has been devoted to improving the power-to-weight ratio for proton exchange membrane ("PEM") fuel cells. Most of this research has involved increasing the power per unit volume of relatively heavy stacks.

The polymer electrolyte electrochemical device of the present invention is a small device. Unlike the situation for stationary or transportation applications (1-200 kW), the main motivation for developing small polymer electrolyte fuel cells (micro to hundreds of watts) does not reside in environmental benefits but in foreseeable improved technical characteristics compared to the established technologies which are, chiefly, primary and secondary batteries. Also, materials cost is a lesser barrier than in transportation applications since batteries are relatively expensive. The expected advantages of Polymer Electrolyte Fuel Cells (PEFC) against batteries are a higher energy density (Wh g$^{-1}$) and no recharging time.

Hitherto, PEFC's have been developed chiefly for large cells where the benefits of having certain regulations (temperature, reactant flows and humidity) are not outweighed by the implied weight and electrical consumption of the associated ancillary components (cooling system compressors and fans, humidifiers). More recently, efforts have been made to reduce the stack weight by replacing the heavy carbon elements with thinner and lighter, metal elements. However, these units were designed for large scale applications, some on the order of about 30 kW, and, therefore, require the same stack ancillary equipment mentioned above. Furthermore, the ancillary equipment included with the stack in these systems has been designed to operate efficiently at the kilowatt level. Scaled down versions of these systems have been attempted in applications that require much less power, such as within the range between about 50 and about 150 Watts. However, these systems are not well suited for stack outputs in the tens or hundreds of watts, since the rotating components, such as pumps and compressors, do not scale down well. As a result even small scale systems of this design are too heavy for many small applications, such as for portable applications and personal use.

Important objectives for portable and personal applications are Watts per unit volume and Watts per unit weight, i.e. W/cm$^3$ and W/g.

Small fuel cells must be designed to work with minimized control. The design has naturally shifted from stacks to planar cells, since planar cells offer enhanced heat removal and air access to the cathode. Any planar configuration implies in turn a mixed conductor/insulator pattern for serial connections. Serial connection between planar cells can be made in two ways. The first, which is often referred to as the banded design, consists of having cathodes arranged on either side and anodes on the opposite side and each cathode being connected to the anode of the next adjacent cell. The connection may be made by creating breaches in the central area of the membrane or by leading the current aside the active area beyond the membrane edge and making the connection there. The latter choice avoids cutting out through the membrane and in so doing avoids the fastidious tightening of each anode separately. The second way of making a serial connection of planar cells is often referred to as the flip-flop design, and involves construction of two cell-house plates, each having cathodes and anodes alternated along its surface. A cathode of one cell is then electrically connected to an anode of the next cell. Passive PEFCs do require membranes having small resistance, regardless of the design chosen for the in-plane serial connection, even if the water originates only from the fuel cell reaction. This fact calls for thin membranes as long as fuel crossover is not a concern. If the PEFC works on average at current densities of 200 mA cm$^{-2}$ or more, fuel crossover is not a concern and the membrane thinness is limited only by its mechanical integrity. It would be advantageous if low compression could be applied while maintaining small interfacial resistances. Among other things this would be favorable for air diffusion to the cathode. Low compression contributes to maintaining the high porosity of the gas backings, which is favorable for air diffusion to the cathode.

Three types of materials and their associated technologies have so far been investigated for small PEFCs:
(i) Miniaturization of conventional PEFC design with graphite or stainless steel plates for the current collectors and cell housing;
(ii) Silicon technology; either patterning of conductive/non-conductive path on silicon wafers or development of methods to create in the wafer a complex architecture of porous silicon layers on top of channels for the reactant gases;
(iii) Printed Circuit Board (PCB) technology; use of a thin layer of copper on electrically insulating composite materials.

The present invention is not restricted to these technologies, since it only requires a gas supplying support plate, which can be made from any sufficiently gas tight material. (e.g. metals, plastics or even paper or paper composites).

There is a whish to improve and to simplify fuel cells. Some attempts have been made, that involve partial replacement of the clamping means by adhesive bonding. One method is described in US 2004/0161655, which discloses the assembly of a electrochemical stack by adhesively bonding the non-active perimeter of a membrane electrode assembly to the perimeter frame of one side of a bipolar plate, using a desired number of membrane electrode assemblies and bipolar plates. A thin layer of curable or thermoplastic adhesive is placed on the sealing areas, and the cell frames and membrane electrode assemblies are pressed together until the adhesive is fully cured and bonds the cell frames and the membrane electrode assemblies together. In this method care must be taken to ensure that the membrane and electrode assemblies are oriented properly so that the cathode side of one membrane and electrode assembly faces the cathode side of a bipolar grid or bipolar plate to which the membrane and electrode assembly is being bonded. Furthermore, adhesive must be carefully applied to the perimeter of any features on the bipolar element, such as, for example, a flow field, a manifold, a channel and combinations thereof to provide the necessary fluidic seal keeping reactant fluids, cooling fluids, or heating fluids confined to their respective areas. Moreover, cell stack produced by this method will still need a clamping force, especially for larger cells.

Therefore, there is a need for a lightweight fuel cell system that provides an improved power density and eliminates much of the ancillary equipment. There is also a need for high performance fuel cells or electrolyser that are simple to produce and convenient to handle. The object of the present invention is thus to provide an improved electrochemical device that can function as a fuel cell or an electrolyser. Another object of the present invention is to provide an electrochemical device that does not require any clamping pressure. Yet another object of the present invention is to provide an electrochemical device which allows easy replacement of the active part.

SUMMARY OF THE INVENTION

The above objects are achieved by the polymer electrolyte electrochemical device and the electrochemical device components of the present invention. With polymer electrolyte electrochemical device is meant a an electrochemical device having an ion conducting polymer membrane electrolyte, for example a proton conducting membrane, or a polymer membrane made by a polymer matrix immobilizing a liquid electrolyte, for example immobilised KOH and $H_2O$. Examples of such devices are hydrogen fed polymer electrolyte fuel cells, direct methanol fuel cells, and polymer electrolyte electrolysers. For simplicity, the following text refers to the anode and the cathode of a fuel cell, but as a person skilled in the art would understand these notations should be swapped when referring to an electrolyser.

The electrochemical device of the present invention comprises an anode current collector, a membrane electrode assembly with anode and cathode gas backings, and a cathode current collector. The membrane electrode assembly is sealed and attached at least to the anode current collector by adhesive means, thereby creating an anode gas chamber. The electrochemical device is preferably designed for use in a multiple cell serial connection arrangement. At least a portion of the adhesive means situated between the membrane electrode assembly and the anode current collector in the electrochemical device is electrically conductive, in order to establish electrical contact as well as sufficient adhesion.

The electrochemical device is a planar configuration air breathing polymer electrolyte electrochemical device comprising an anode current collector, a cathode current collector, and a membrane electrode assembly. The membrane electrode assembly comprises a solid ion conducting polymer membrane electrolyte, an anode, an anode gas backing a cathode and a cathode gas backing, and is arranged between the anode current collector and the cathode current collector, such that the anode gas backing is directed towards and attached to the anode current collector and the cathode gas backing is directed towards and attached to the cathode current collector. The membrane electrode assembly is sealed and attached directly to the anode current collector by means of an adhesive. The adhesive covers a first region, adjacent and corresponding to the anode gas backing, and a second region, which surrounds the first region. Thereby a seal is created between the membrane electrode assembly and the anode current collector, and thus an anode gas chamber is formed. The adhesive is electrically conductive in at least the first region. By this arrangement the membrane electrode assembly is easily and effectively attached to the anode current collector and sufficient contact is achieved between the anode gas backing and the anode current collector without any need for clamping equipment. The construction is quite simple and yet gives a high peak power, such as 300 mW cm$^{-2}$ in complete passive mode, save for the controlled hydrogen flow, when the Pt loading is 0.3 mg cm$^{-2}$ on each electrode.

In one preferred embodiment of the invention the anode current collector is an electrically conductive layer, which is attached to an electrically non-conductive support. The anode current collector and the support form an anode current collector assembly, which has one or more openings for gas access. The anode current collector and the support may thereby be made of different materials. The anode current collector preferably is an adhesive tape, which comprises a conductive substrate foil. The foil has a first surface directed towards the membrane electrode assembly and a second surface directed away from the membrane electrode assembly and the first surface is provided with an adhesive layer. An anode current collector made of a flexible foil allows the support to have a non-planar surface, such as an arched or vaulted shape. The simple attachment of an adhesive tape is advantageous in production of the device, since it enables quick and easy assembly of the device. Optionally the second surface is also provided with an adhesive layer, whereby easy attachment to the support can be achieved.

In another embodiment the cathode current collector is electrically connected to the cathode gas backing by electrically conductive adhesive means, thereby further simplifying the assembly of the device.

The invention also relates to components for use in a planar configuration air breathing polymer electrolyte electrochemical device. The components may be used in single or series connection arrangements and their configuration differs slightly depending on the intended connection arrangement.

The electrochemical device component for use in a planar configuration air breathing polymer electrolyte electrochemical device, such as the one defined above, and is adapted to be attached to an anode support having one or more openings for gas access. The component comprises an anode current collector, which comprises an electrically conductive foil having one or more openings for gas access; a cathode current collector; and a membrane electrode assembly. The membrane electrode assembly comprises a solid ion conducting polymer membrane electrolyte, an anode, an anode gas backing, a cathode and a cathode gas backing, and is arranged between the anode current collector and the cathode current collector, such that the anode gas backing is directed towards the anode current collector and the cathode gas backing is directed towards the cathode current collector. The membrane electrode assembly is attached directly to the anode current collector by means of an adhesive layer provided on the anode current collector, wherein said adhesive layer covers a first region adjacent and corresponding to the anode gas backing, and a second region surrounding said first region. Thereby a sealing is created between the membrane electrode assembly and the anode current collector and an anode gas chamber is thus formed. The adhesive layer is electrically conductive in at least the first region. The component thus includes all essential parts of a fuel cell and needs only to be attached to a support that allows for gas access. The component is a replaceable, ready-to-use component that can be easily attached to supports of various materials and shapes.

The second surface of said anode current collector may be provided with an adhesive layer and a releasable protective sheet. The protective sheet is intended to be removed before use of the component. When the component is to be used in a fuel cell, the protective sheet is removed and the component is easily attached to a support.

The membrane electrode assembly may also be attached to the cathode current collector by adhesive means, wherein at least a portion of the adhesive adjacent to the cathode gas backing is electrically conductive. Thereby effective and simple attachment of the cathode current collector to the membrane electrode assembly is achieved.

An electrochemical device component according to the invention, intended for use in a series connection arrangement in a planar configuration air breathing polymer electrolyte electrochemical device is adapted to be connected in series to one or more similar components and to be attached to an anode support having openings for gas access. This component comprises a current collector element, which comprises an electrically conductive foil that consists of a cathode current collector portion and an anode current collector portion. The component further comprises a membrane electrode assembly, comprising a solid ion conducting polymer membrane electrolyte, an anode, an anode gas backing, a cathode and a cathode gas backing. The membrane electrode assembly is arranged in the component such that the cathode gas backing is directed towards the cathode portion of the current collector element, and the anode gas backing is directed away from the current collector element. The membrane electrode assembly is attached to the current collector element by means of an adhesive layer provided on the cathode portion of the current collector element, said adhesive layer covering at least a region adjacent and corresponding to the cathode gas backing, and being electrically conductive in at least the region. The anode portion of the current collector element extends laterally from the cathode current collector portion and functions as an anode current collector for an adjacent series-connected component, when in use. The anode current collector portion has openings for gas access and is provided with an adhesive layer on a surface of the current collector element. This adhesive layer is directed away from the cathode side of the membrane electrode assembly of the component and is directed towards the anode side of the membrane electrode assembly of the adjacent electrochemical device component, when in use. The adhesive layer provided on the anode portion covers a both first region adjacent and corresponding to the anode gas backing of the adjacent component and a second region surrounding the first region. The adhesive layer is electrically conductive in at least said first region, thereby enabling the creation of a seal between the membrane electrode assembly of the adjacent component and the anode current collector. This component allows for easy assembly of series connected fuel cell components.

The invention also relates to a polymer electrolyte electrochemical device comprising two or more electrochemical device components as described above, arranged in series on an anode current collector support, wherein the anode current collector portion of the current collector element of one component functions as the cathode current collector of an adjacent component.

SHORT DESCRIPTION OF THE DRAWINGS

FIG. 3b is a schematic cross sectional side view of the polymer electrolyte electrochemical device shown in FIG. 3a;

Figure 5:
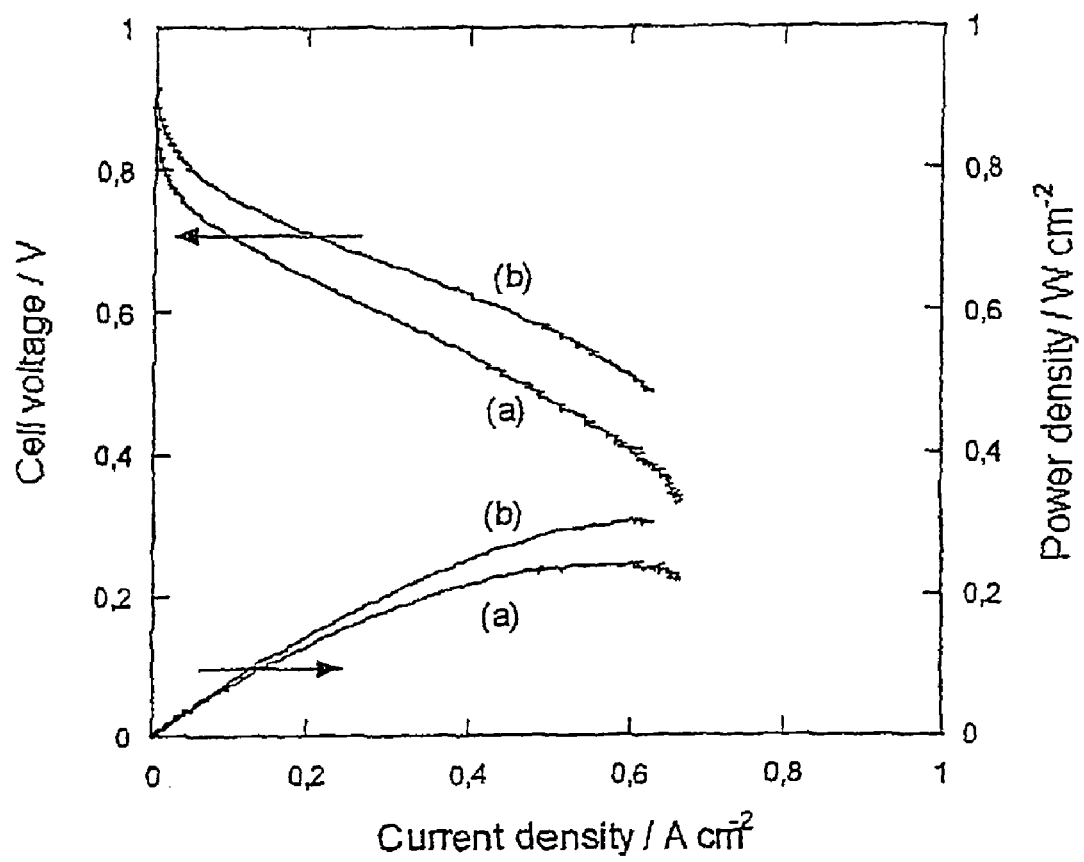

FIG. 5: cell voltage and power density vs. current density of a cell with a strip PCB cathode current collector (see Example 1). Curve (a) initial performance, curve (b) performance after 60 h at 0.5 V. No preconditioning prior to polarization. Sweep rate 0.4 $mVs^{-1}$.

Figure 6:
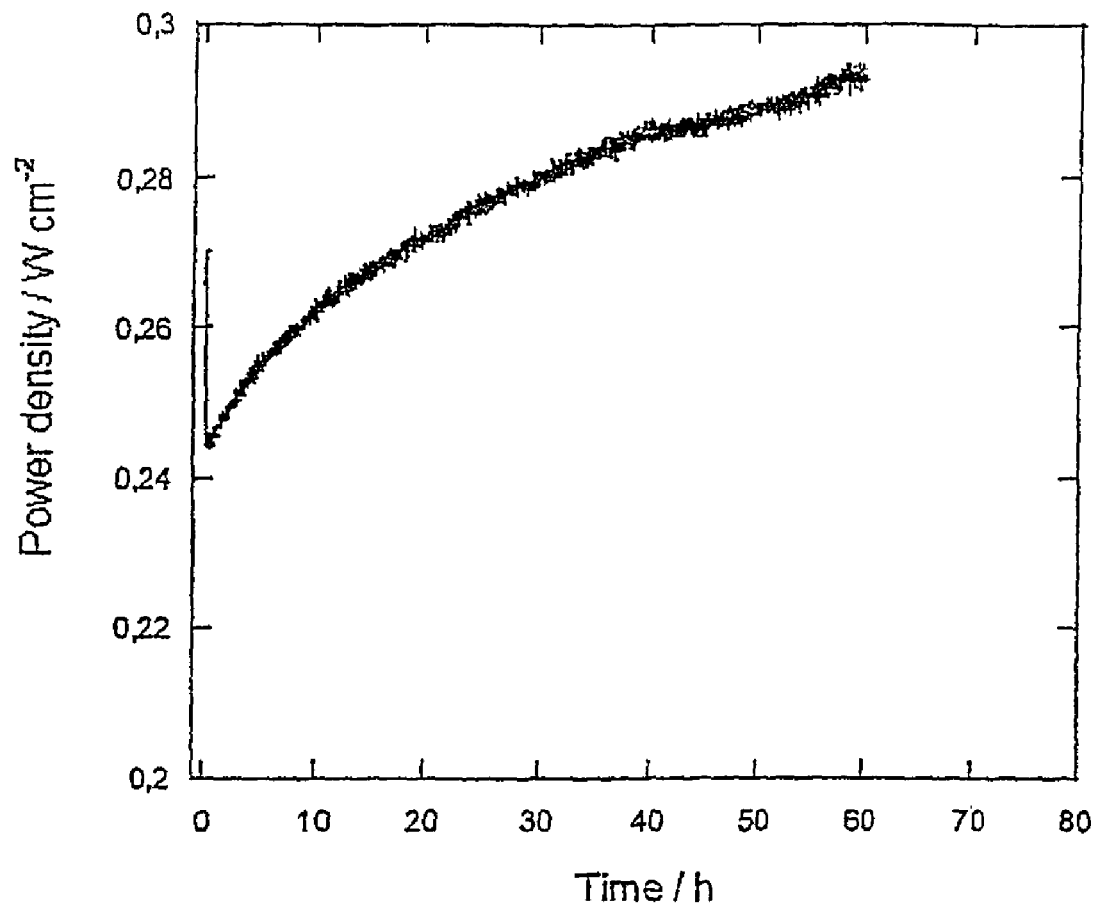

FIG. 6: Long-time test of a cell with a strip PCB cathode current collector at a voltage of 0.5 V. No cell pre-conditioning, (see Example 1).

DETAILED DESCRIPTION OF THE INVENTION

Figure 1:
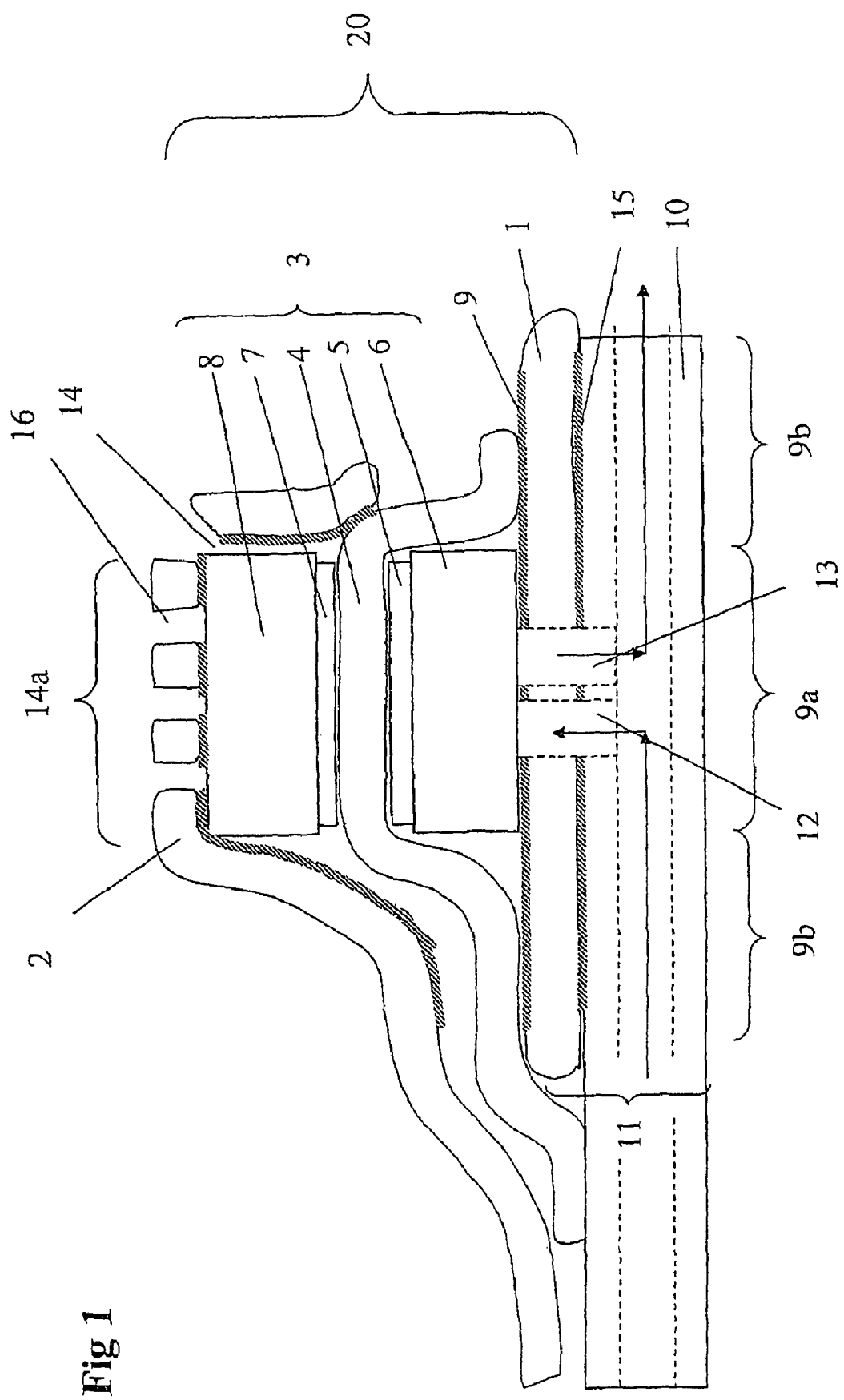
FIG. 1 is a schematic cross sectional side view of a polymer electrolyte electrochemical device comprising an electrochemical device component adapted for single cell arrangement.

The polymer electrolyte electrochemical device and will now be described in detail with reference to the appended drawings, in which reference numbers indicated by ' or " relate to corresponding parts that also appear in other embodiments or drawings:

Referring to FIG. 1 which illustrates a planar configuration air breathing polymer electrolyte electrochemical device according to the invention, the device comprises an anode current collector (1), a cathode current collector (2), and a membrane electrode assembly (MEA) (3). For clarity reasons, FIG. 1 is not drawn to scale. In reality, the MEA is very thin. The membrane is typically from 15 to 150 µm thick, the catalytically active electrodes are typically from 1 to 20 µm thick, and the gas backings are typically from 50 to 500 µm thick. The membrane electrode assembly comprises a solid ion conducting polymer membrane electrolyte (4) that is provided with an anode (5) and anode gas backing (6) on one surface and a cathode (7) and cathode gas backing (8) on the opposite surface. The electrodes (anode and cathode) should typically consist of carbon particles (e.g. Vulcan XC-72), binded with a polymer which is ion conducting to form a porous matrix. Onto the carbon particles are catalyst particles dispersed. For the anode the catalyst particles are typically made of Pt and PtRu-alloys. For the cathode the catalyst particles can typically comprise Pt and also non-noble metal oxides. The ion conducting membrane is typically made of a sulfonated aromatic ionomer (e.g. Nafion). To increase the power density of the electrochemical device, it is an advantage if the membrane is thin, i.e. thinner than 50 micrometer, and strengthened by, for example, a porous perflourinated polymer (e.g. Teflon). Membranes used in PRIMEA products from Gore Inc. are examples of such membranes. The gas backing should preferably consist of a support layer and a microporous layer. The support layer should typically consist of a hydrophobised carbon fiber cloth or a carbon paper. The microporous layer (consisting of carbon particles binded by a perflourinated polymer, e.g. Teflon) improves the electrical contact resistance and the water management properties of the gas backing. Each of the two opposing surfaces of the MEA has an active portion and a non-active portion. The active portion is covered by the anode or cathode and its respective gas backing, whereas the non-active portion remains uncovered. The non-active portion, which has the shape of a frame, should have a frame width between 1-10 mm. It should be large enough so that a sufficient sealing is achieved, on the other hand it should not be too large in order to maximise the active to non-active area of the device. Said seal being formed need not be completely gas tight, but it should be sufficiently gas tight so that back diffusion of oxygen into the anode gas chamber can only occur to a minor extent.

The surface area of the solid polymer membrane electrolyte (4) is larger than the surface area of the anode and cathode and their gas backings. Thereby a non-active area surrounds the active area. The MEA is arranged between the anode current collector (1) and the cathode current collector (2), such that the free surface of the anode gas backing (6) is directed towards and attached to the anode current collector (1) and the free surface of the cathode gas backing (8) is directed towards and attached to the cathode current collector (2).

The MEA (3) is sealed and attached directly to the anode current collector (1) by means of an adhesive (9). The adhesive should typically be an acrylate adhesive filled with electrically conducting particles, these particles being plastic spheres coated by a conductive metal (e.g. silver or gold). The electrical resistance through the adhesive layer should typically be less than 10 milliohm per square inch (when measured according to MEL-STD-202, method 3 07 maintained at 5 psi). The adhesive covers a first region (9a), adjacent and corresponding to the anode gas backing (6) (i.e. the active portion of the MEA), and a second region (9b), which surrounds the first region (9a) (i.e. the non-active portion of the MEA). When the MEA and the anode current collector are brought together in the device, the anode current collector comes into contact with both the active portion (i.e. the anode gas backing (6)) and the surrounding non-active portion of the MEA. The adhesive thus covers an area of the anode current collector surface that has a size and shape sufficient to create a seal between the membrane electrode assembly (3) and the anode current collector (1). Both the active portion and the non-active portion of the anode side of the MEA are thus adhesively attached to the anode current collector. Thereby a sealed anode gas chamber is formed in the gas backing between the anode (5) and the anode current collector (1). If the current collector component is a conductive foil, the bulk resistance of the material chosen for the current collector should preferably lie in the range of $10^{-8}$ to $10^{-7}$ $\Omega$m. Aluminum, copper and silver have bulk conductivities in the range of $1.5$-$2.5 \cdot 10^{-8}$ $\Omega$m. Numerous alloys would qualify too; e.g. Cu—Ni(10%) or Fe—Ni(1%) have bulk resistances of about $10^{-7}$ $\Omega$m. The cathode current collector (2) or cathode current collector portion (102) can also be a carbon fiber paper or a woven carbon fiber cloth, optionally integrated with the cathode gas backing. In operation of the device, fuel gas enters through the gas access opening (12), flows via the gas chamber in the porous gas backing (6), where it comes into contact with the anode and the electrochemical reaction takes place, and excess fuel gas exits through the opening (13).

Electrical contact is needed between the gas backing (6) and the anode current collector (1). Therefore the adhesive is electrically conductive in at least the first region (9a), which is in contact with the active portion of the MEA. The adhesive may be electrically conductive also in the second surrounding portion (9b), thereby further simplifying the manufacture of the device, since the application of adhesive to the current collector can be made without consideration to the location of active and non-active regions.

The anode current collector (1) of this embodiment is an electrically conductive layer, and is attached to an electrically non-conductive support (10). The anode current collector (1) and the support (10) form an anode current collector assembly (11). The anode current collector assembly has openings (12, 13) for gas access. The support (10) is shown as an even plate in FIG. 1. However, it may have various surface shapes, such as arched, vaulted, cylindrical or conical. The support plate can also have one or several edges. This is possible since the anode current collector is a thin layer that may be coated directly to the support or be made of a flexible material, such as a conductive foil, a conductive tape or a self-sustaining conductive adhesive layer. When an adhesive tape is used for the anode current collector, the tape comprises a conductive substrate foil provided with an adhesive layer (9) on at least on a first surface, which is directed towards the membrane electrode assembly (3). An adhesive layer (15) may be provided on a second surface directed away from the MEA. This adhesive layer is then used for attachment of the anode current collector to the support (10). A self-adhesive tape is particularly advantageous, because it is convenient to handle.

The electrochemical device of the embodiment shown in FIG. 1 has a cathode current collector that is electrically connected to the cathode gas backing (8) by electrically conductive adhesive means (14). The cathode current collector is a conductive foil (2) which at least partly covers the cathode gas backing (8). In order to allow air breathing, the cathode current collector foil and the adhesive layer are provided with openings (16) arranged in the area corresponding to the cathode gas backing. At least a portion (14a) of the adhesive means (14) situated between the membrane electrode assembly and the anode current collector is electrically conductive. It is important that the area of the holes in the current collector foil is large enough so that sufficiently good oxygen transport to the cathode is obtained. The electrical resistance of the cathode current collector and its contact resistance to the gas backing is, on the other hand, increased when less of the cathode gas backing is covered. A high performance device must thus have an optimal balance between covered and non-covered area of the cathode gas backing, depending on the specific contact resistance among other things. By the use of adhesive tapes or layers in the electrochemical device the active component(s) and the device itself are quick and easy to assemble.

Figure 2:
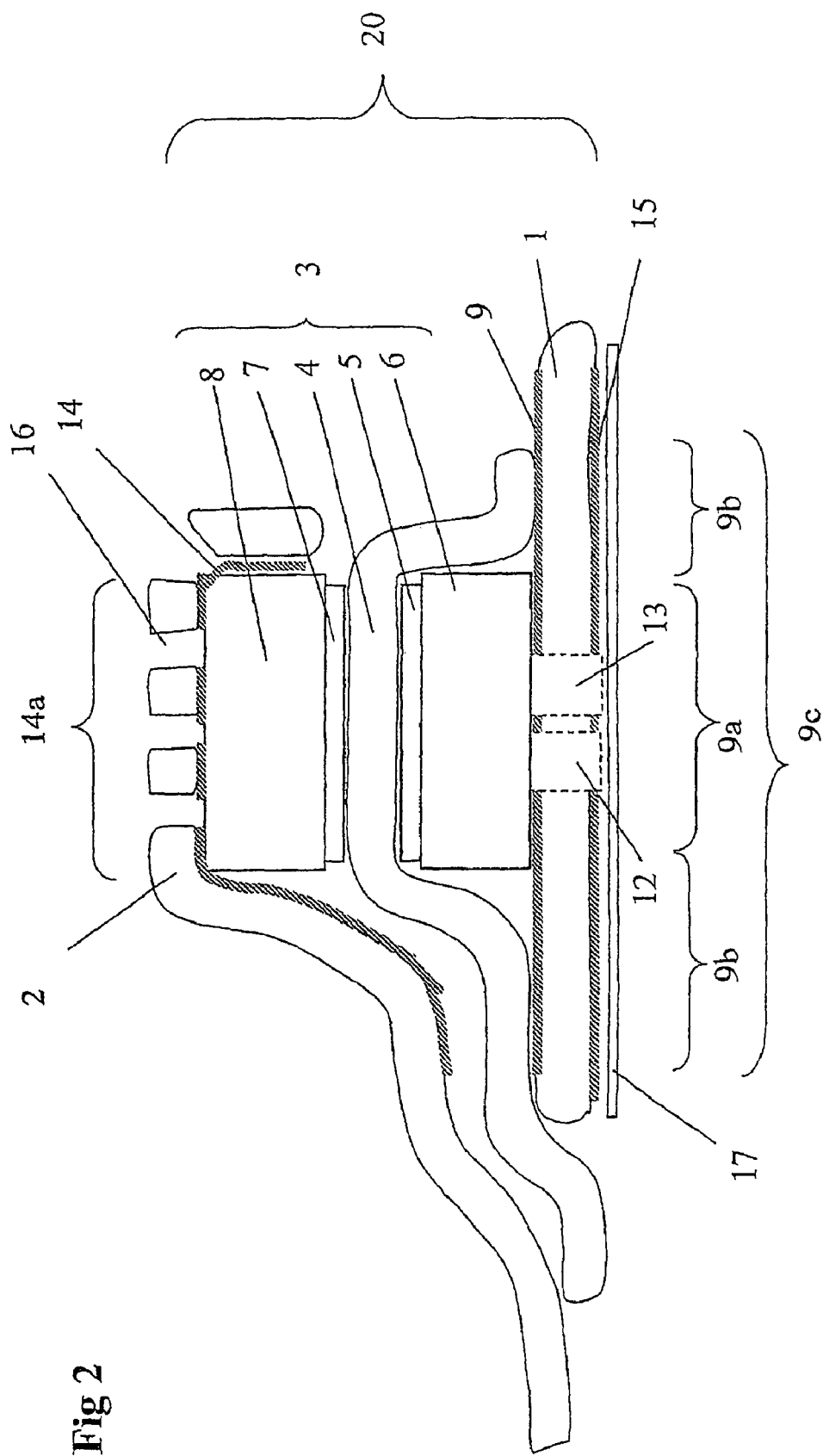
FIG. 2 is a schematic cross sectional side view of an electrochemical device component adapted for use in a single cell arrangement, as shown in FIG. 1.

FIG. 2 depicts an electrochemical device component (20) for use in a planar configuration air breathing polymer electrolyte electrochemical device, such as the one shown in FIG. 1. The component is adapted to be attached to an anode support (10) having openings for gas access. This component comprises the same elements as described for the electrochemical device above, but does not include an anode support. The anode current collector is provided with an adhesive layer (15) on the surface that is directed away from the MEA. This adhesive layer is intended for attachment of the component to a support and is protected by a releasable protective sheet (17). When the component is to be used in an electrochemical device, the protective sheet is removed, thus exposing the adhesive layer of the component, and the component can simply be attached to the chosen support.

Figure 3A:
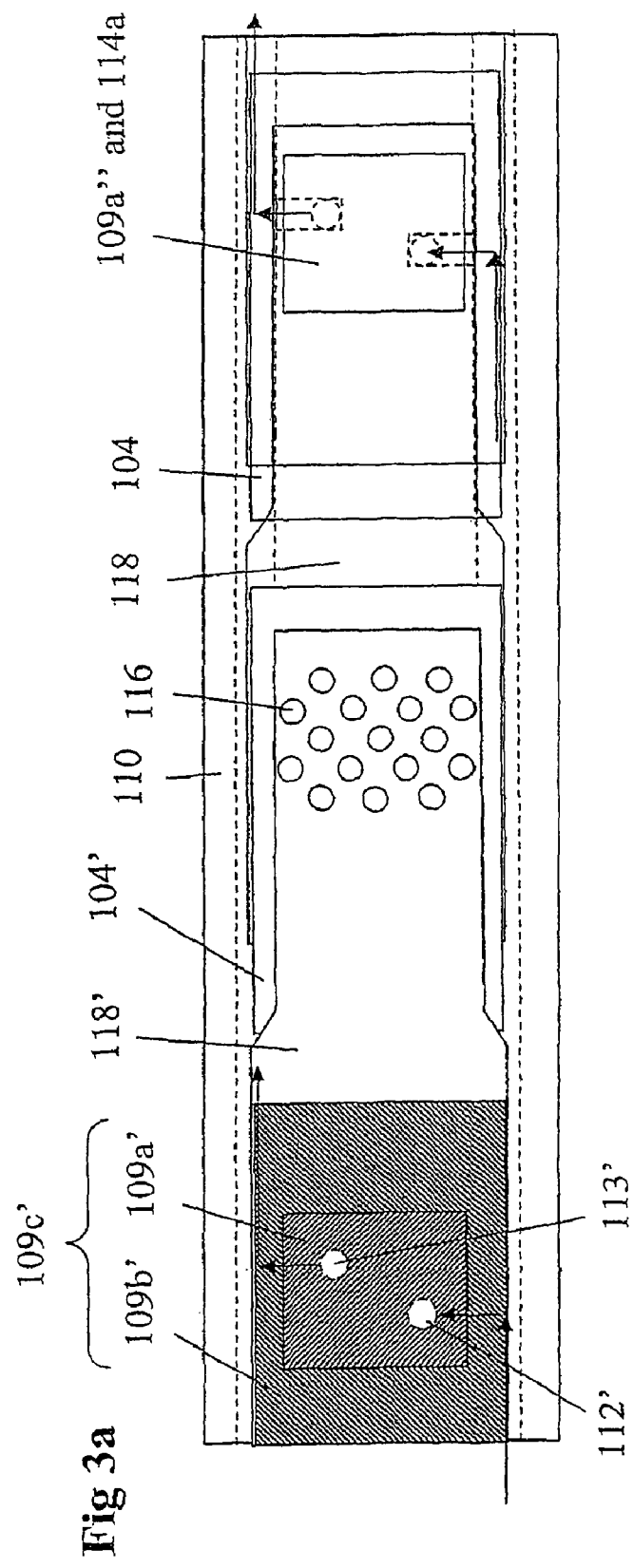
FIG. 3a is a schematic top view of a polymer electrolyte electrochemical device comprising electrochemical device components adapted for series connection.
Figure 3B:
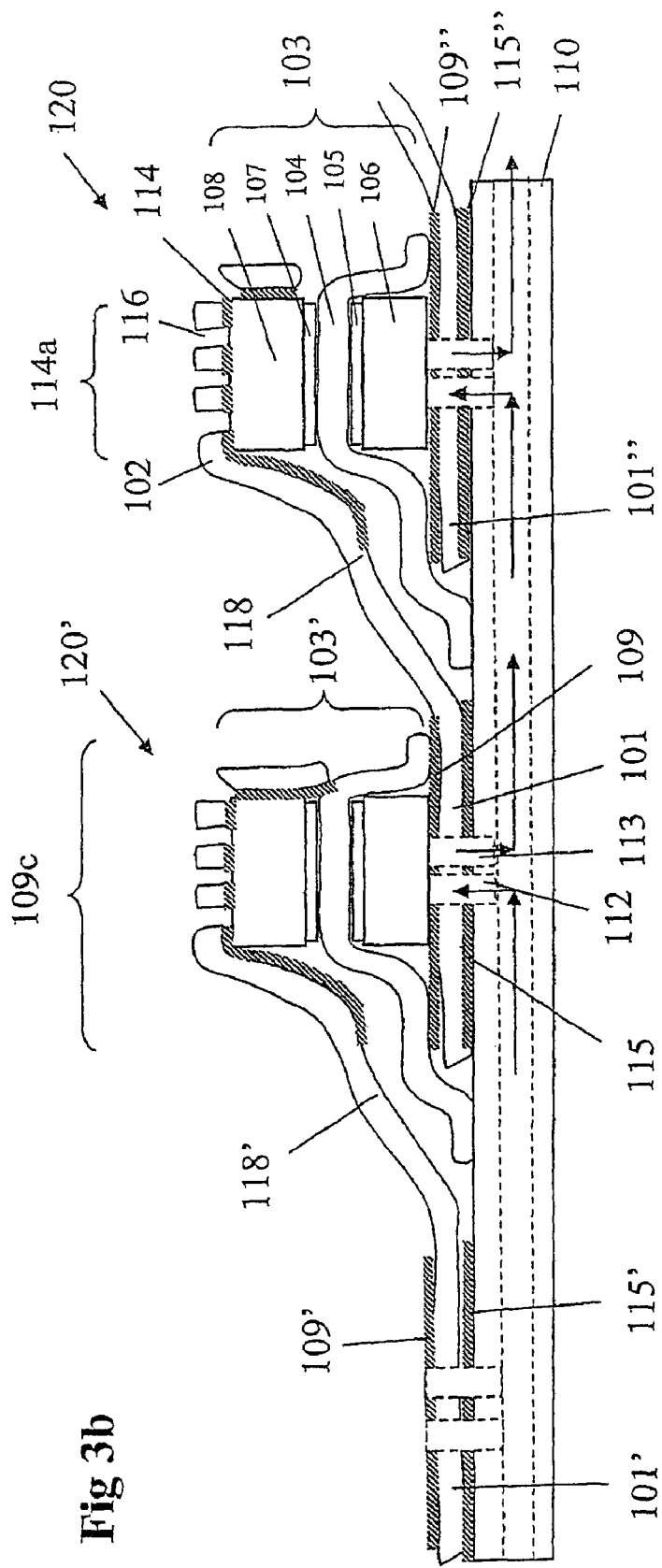

FIGS. 3a and 3b depict an electrochemical device component (120) for use in a series connection arrangement in a planar configuration air breathing polymer electrolyte electrochemical device. FIG. 3a is a top view of the device, and FIG. 3b is a cross-sectional view. The principle of the series arrangement component is the same as described above, but instead of having separate anode and cathode current collectors, adjacent component share a current collector element, which functions as cathode current collector for one cell and as anode current collector for an adjacent cell. The component (120) is thus adapted to be connected in series to one or more similar components (120') and to be attached to an anode support (110) having openings (112, 113) for gas access. Accordingly, the component (120) comprises a current collector element (118) and a membrane electrode assembly (MEA) (103). The current collector element (118) comprises an electrically conductive foil consisting of a cathode current collector portion (102) and an anode current collector portion (101). The MEA (103) comprises a solid ion conducting polymer membrane electrolyte (104), an anode (105), an anode gas backing (106), a cathode (107) and a cathode gas backing (108), and is arranged in the component (120) such that the cathode gas backing (108) is directed towards the cathode portion (102) of the current collector element (118), and the anode gas backing (106) is directed away from the current collector element (118). The MEA is attached to the current collector element (118) by means of an adhesive layer (114) provided on the cathode portion (102) of the current collector element (118), said adhesive layer (114) covering a region (114a) adjacent and corresponding to the cathode gas backing (108), and being electrically conductive in at least the region (114a). The different elements and adhesive layers of the component according to this embodiment may be the same as described for the single cell component above.

The anode portion (101) of the current collector element (118) extends laterally from the cathode current collector portion (102) and functions as an anode current collector for an adjacent series-connected component (120') when in use. The anode current collector portion (101) has openings (112, 113) for gas access, and is provided with an adhesive layer (109) on a surface of the current collector element (118) directed away from the cathode side of the membrane electrode assembly (103) of the component (120) (upwards in FIG. 3b). Thus the adhesive layer (109) is directed towards the anode side of the membrane electrode assembly (103') of the adjacent electrochemical device component (120'), when in use. The adhesive layer (109) covers a first region (109a) adjacent and corresponding to the anode gas backing (106') of the adjacent component (120') and a second region (109b) surrounding the first region (109a). Thereby a seal can be created between the membrane electrode assembly (103') of the adjacent component and the anode current collector (101) and a gas chamber is thus formed in the same way as described for the electrochemical device above. The adhesive layer is electrically conductive in at least the first region (109a), but may be conductive also in the surrounding region (109b). The anode current collector portion (101) may also be provided with an adhesive layer (115) on the surface directed away from the MEA of the adjacent component, which adhesive layer is intended for attachment of the component to the support. Both adhesive layer (109 and 115) may be protected by releasable sheets (not shown) during transport and storage. The first anode portion and the last cathode portion may have a different design to allow efficient current collection.

In FIG. 3a, the anode portion (101') with its adhesive layer (109c') is seen to the left. The first region (109a') of the adhesive layer is in the area where the gas access openings are located, which corresponds to the active portion of the MEA of an additional component, not yet attached to the device. The first region is surrounded by the second region (109b'), which is intended to seal against the non-active portion of the MEA. In the middle of FIG. 3a a complete fuel cell is shown. To the right is a transparent view of the device component (120) illustrating the lateral positioning of the active area (109a" and 114a), the membrane (104), the cathode current collector portion (102), the cathode collector portion (102), and the anode current collector portion (101").

When one or more components (120, 120') are connected in series on an anode current collector support (110), a polymer electrolyte electrochemical device is obtained, in which the anode current collector portion (101) of the current collector element of one component (120) functions as the anode current collector of an adjacent component (120'). When arranged to the support, one component (120) is thus partly overlapped by the adjacent component (120'), such that the anode gas backing of the adjacent component (120') is placed on top of the upper side of the anode current collector portion (101) of the component, thereby forming an electrochemical cell.

The above described electrochemical device components for use in single or series arrangement are replaceable active portions or components of an electrochemical device, such that a used or run down component can be torn off and replaced by a fresh one. This replaceable active portion resembles a plaster or band-aid that can be easily torn off and replaced with a fresh one.

Figure 4:
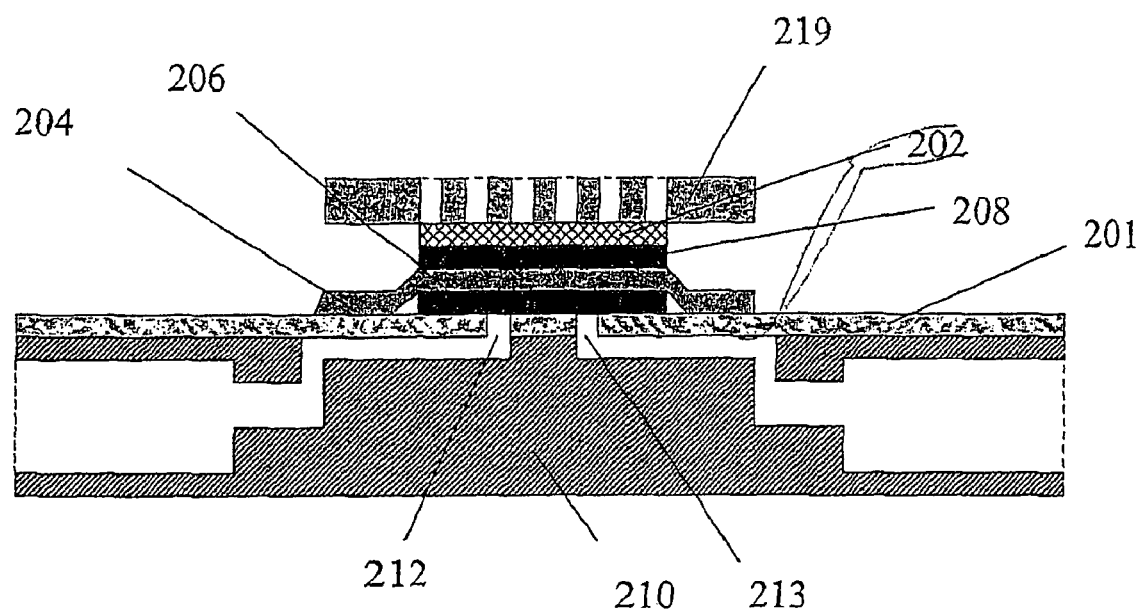
FIG. 4 is a schematic cross sectional side view of an embodiment of the polymer electrolyte electrochemical device, in which the cathode current collector comprises an electrically conductive mesh and a printed circuit board (PCB). The PCB is also functioning as a clamping means.

FIG. 4 illustrates an alternative embodiment having the same arrangement for sealing the MEA to the anode current collector as the embodiments shown in FIGS. 1-3, having a cathode current collector which comprises an electrically conductive mesh (202), made e.g. of stainless steel, and a clamping means (219). The clamping means preferably comprises a printed circuit board plate provided with apertures for air access. If a clamping means is applied it only helps to have a good electrical contact between the various components. It is by no means used to tighten the hydrogen compartment (gas chamber) from air. The gas chamber is secured by the adhesion of the membrane onto the conductive adhesive layer lying on top of the anode current collector. In a scaled-up process, the adhesive at this position needs not be conductive. Only the adhesive layer lying between the anode current collector and the anode backing needs to be conductive. The fact that neither a mask nor a compression force is required for the tightening of the anode compartment simplifies the design and will help to reduce the distance between two consecutive cells serially connected on a board.

If the electrochemical device is clamped then the conducting adhesive between the current collector foils and the gas backings can be omitted. The clamping means may comprise a printed circuit board (PCB) with one or more apertures for air access. The clamping means geometry may be designed in different ways: a strip with a number linearly arranged holes for air; a square with a single hole or a square with an array of holes. The clamping means may be cut out from a plain Printed Circuit Board (PCB). The PCB is e.g. a commercial epoxy-glass composite uniformly plated with a 30 μm thick copper layer on one side.

The membrane used in the electrochemical device may be any polymer with sufficient conductivity for either protons (acid fuel cell) or hydroxide ions (alkaline fuel cell) and with sufficient mechanical integrity. In state of the art acid polymer electrolyte fuel cell, Nafion is the most well known material (membranes from Dupont) but cal also be poured into another polymer matrix with better mechanical properties such as MEAs from Gore. Electrodes can be deposited on the membrane or on the side of the backing facing the membrane. The invention is not restricted to the type of catalysts used, as the optimal catalysts differ much from an acidic polymer electrolyte fuel cell, an alkaline polymer electrolyte fuel cell, or an electrolyser (acid or alkaline) as the electrochemical reactions differ. The electrodes of the MEA may consist of catalyst containing carbons and an ionomer. The electrodes do not to cover the complete membrane area. Preferably, in order to save catalyst, they should only cover the active areas where the gas backings are attached. (Product example: Primea 5510 from Gore (0.3 mg Pt cm$^{-2}$, 25 μm thick membrane)). By gas backing is meant any electrode supporting means that could be included or not included in the membrane electrode assembly. If the electrode is self-supporting, that electrode should be understood to include both gas backing and electrode. The gas backing may be an electrically conducting porous support with suitable hydrophobic/hydrophilic properties, for example a hydrophobised carbon cloth with a microporous layer turned against the MEA (Product example: Carbel products from Gore). The anode current collector may be made of copper foil having an electron-conductive adhesive film on one or on both sides. The adhesive may be based on a silver-filled acrylic substance. The thickness of the adhesive film and copper foil is preferably about 5 and 70 μm, respectively. The support of the anode current collector may be a Plexiglas sheet, preferably about 5 mm-thick wherein gas channels are milled.

It is important to note that the adhesives used (connecting to the gas backings and the membrane electrode assemblies) should be sufficiently chemically inert in the chemical and electrochemical environment of the polymer electrolyte electrochemical device. This is important in order not to poison the membrane ionomer or the catalyst. The adhesive should also preferably act as a protecting layer to the current collector foil.

EXAMPLE 1

FIGS. 5 and 6 show results for a single cell with the cathode current collector being a gold plated stainless steel net (15×15 mm). The clamping means (and current collector) was cut out from a plain Printed Circuit Board (PCB). The PCB was a commercial epoxy-glass composite uniformly plated with a 30 μm thick copper layer on one side. The Membrane Electrode Assemblies (MEAs) were Primea 5510 from Gore (0.3 mg Pt cm$^{-2}$, 25 μm thick membrane). Gas backings were Carbel products from Gore, with their hydrophobic side turned against the MEA. The anode current collector was made of a copper foil having an electron-conductive adhesive film on one side. The supplier was TESA (product No. 4384). The adhesive was based on a silver-filled acrylic substance. The thickness of the adhesive film and copper foil was about 5 and 70 μm, respectively. The anode current collector was supported by the cell house, a 5 mm-thick Plexiglas sheet wherein gas channels were milled. The arrangement of these different elements to form the single cell is now described (FIG. 4). The Plexiglas item was cut and T-shaped channels were milled on the top side to later conduct hydrogen. A double-sided non-conductive adhesive tape from 3M was then stuck onto the Plexiglas, completely covering its upside surface and closing thereby the originally opened channels. The protective layer on the upside of the adhesive tape was then peeled off whereupon the copper foil was adhered, forming the anode current collector. Next, inlet and outlet for hydrogen were formed by cutting out from the two-layer sandwich (adhesive copper foil/adhesive tape) the part that covered the facing segments of the T-shaped channels. Then, after removal of the upside protective layer of the copper foil, apiece of Carbel backing of dimensions 14×14 mm (about 2 cm$^2$) was centered so as to cover the gas in-and outlet and gently stuck onto the anode copper foil. The dimensions of this backing determined the active area of the cell. Then, a piece of MEA with dimensions 25×25 mm was cut out, and centered over the anode backing. The surface of the MEA not covering the backing was then sealed against the anode copper foil by softly wiping the MEA down with e.g. a smooth Teflon piece. The cell was completed by forming the cathode current collector. A piece of backing identical with the anode one was lined up on the anode backing-MEA, whereupon a gold-plated stainless steel grid was laid. The whole sandwich was finally clamped together by the cathode current collector pressed against the Plexiglas support by two screws and bolts. Pure and dry hydrogen was used at the anode while the cathode was in contact with still air atmosphere. The gas pressures on both sides were at equilibrium with the room atmosphere. The hydrogen flow was controlled by a mass flow meter (Brooks Instruments). The H$_2$ flow rate was 25 mL min$^{-1}$. Save for the control of the hydrogen flow, the cell worked in complete passive mode. All reported measurements were recorded with the cell being horizontal and the cathode on top.

FIG. 5 shows two polarization curves measured on this cell. These curves demonstrate the good performance of this cell. A power density of 300 mW cm$^{-2}$ was reached at a cell voltage of 0.5 V. Curve (a) was recorded shortly after cell installation and is not as good as curve (b). Polarization curve (b) was recorded 3 h after the cell had been held for 60 h at the voltage of 0.5 V. The difference is most likely due to a drier MEA at inception. Polarization experiments repeated after curve (b) were alike. In this case, the enhancement from (a) to (b) was mainly due to an improvement in the oxygen reduction kinetics (increase from 0.4 to 3 mA cm$^{-2}$ at 900 mV) while changes in ohmic losses were minor. The cell had an ohmic resistance of 170 mΩcm$^2$ as measured by electrochemical impedance spectroscopy. FIG. 6 shows the evolution of power density with time at a constant cell voltage of 0.5V for 60 hours.

Comments to Example 1: In general, cells made according to Example 1 have reproducible characteristics and are easily mounted. Looking at the polarization curve of FIG. 5, at a cell voltage of 0.5 V the losses (about 700 mV) can be divided into 71% losses stemming from the oxygen reduction kinetics (obtained by extrapolating the Tafel slope), 17% from heat and mass-transport presumably occurring at the cathode (difference between the extrapolated Tafel slope and the iR-corrected curve), and 12% from ohmic losses (obtained from current interrupts). These data give an overview of the situation. It is difficult to reduce the kinetic losses unless the platinum loading at the cathode is raised by much. Even so, for the kinetic gain to be effective at high currents, the mass transport characteristics of the cathode must be simultaneously improved.

EXAMPLE 2

No Clamping Force

In another example a cell was assembled and tested where no clamping force was applied. The components were similar to what had been used in the previously mentioned cells except for the cathode current collector steel net and the PCB board. Instead as a cathode current collector a perforated conductive tape (a copper foil having an electron-conductive adhesive film on one side) was used. Before assembling the cell the MEA and the gas backings were integrated with each other into one unit by hot pressing at 110° C. The integrated gas backing and MEA was attached and sealed to the anode current collector. The MEA was made so large so that a good seal was formed and so that the anode and cathode current collectors did not short cut with each other. Finally, the cathode current collector conductive tape was connected to the cathode gas backing. The active cell area was about 2 cm$^2$. During electrochemical cell testing with pure hydrogen it provided 500 mA at a cell voltage of 0.3 V.

EXAMPLE 3

In this example the cell area and the current collector materials were the same as in example 2. The electrodes were ELAT-electrodes (ETEK), which includes both a gas backing layer and an electrochemically active layer, with a Platinum loading of 0.5 mg/cm$^2$. The membrane was Nafion 1035 Dupont). The membrane electrode assembly was formed by hot pressing at 110° C. Prior to hot pressing the membrane was pre-treated by boiling in 3% $H_2O_2$ for 1 hour, boiling in $H_2SO_4$ for 1 hour, and finally, two times boiling in pure $H_2O$ for 1 hour. The electrochemical testing was conducted with pure hydrogen and the results are given in Table 1.

TABLE 1

| E (mV) | I (mA) |
|---|---|
| 820 | 0 |
| 600 | 13 |
| 500 | 20 |

TABLE 1-continued

| E (mV) | I (mA) |
|---|---|
| 350 | 33 |
| 190 | 44 |

EXAMPLE 4

This example is a three-cell device using the same materials as in example 1. The dimensions of the active area (size of gasbackings, Carbel) of each cell is 15 times 25 mm and the dimensions of each membrane electrode assembly (Primea 5510, Gore) is 25 times 35 mm. The interconnect between each cell was a conductive copper tape, leading from the anode current collector to the cathode current collector gold plated net. In this example the PCB board only had the function of being a clamping means on top of the gold plated net. Electrochemical testing results with pure hydrogen are given in Table 2.

TABLE 2

| E (mV) | I (mA) |
|---|---|
| 2500 | 0 |
| 1900 | 100 |
| 1700 | 200 |
| 1500 | 300 |

The invention claimed is:

1. An electrochemical device component (20) for use in a planar configuration air breathing polymer electrolyte electrochemical device adapted to be attached to an anode support (10) having openings for gas access further comprising:
   an anode current collector (1), which comprises an electrically conductive foil having openings (12, 13) for gas access;
   a cathode current collector (2); and
   - a membrane electrode assembly (3), which comprises a solid ion conducting polymer membrane electrolyte (4), an anode (5), an anode gas backing (6), a cathode (7) and a cathode gas backing (8),
   said membrane electrode assembly (3) being arranged between said anode current collector (1) and said cathode current collector (2), such that the anode gas backing (6) is directed towards the anode current collector (1) and the cathode gas backing (8) is directed towards the cathode current collector (2),
   said membrane electrode assembly (3) being attached directly to the anode current collector (1) by means of an adhesive layer (9) provided on the anode current collector, wherein said adhesive layer covers a first region (9*a*) adjacent and corresponding to the anode gas backing (6), and a second region (9*b*) surrounding said first region (9*a*), thereby creating a sealing between the membrane electrode assembly (3) and the anode current collector (1) and thus forming an anode gas chamber, and wherein said adhesive layer is electrically conductive in at least the first region (9*a*),
   wherein a second surface of said anode current collector (1) is provided with a second adhesive layer (15) and a releasable protective sheet (16), removed before use of the component.

2. The electrochemical device according to claim 1, wherein the anode current collector (1; 1') is an electrically conductive layer, which is attached to an electrically non-conductive support (10), and wherein said anode current collector (1) and said support (10) forming an anode current collector assembly (11), said anode current collector assembly having openings (12, 13) for gas access.

3. The electrochemical device according to claim 2, wherein the anode current collector (1) forms a part of an adhesive tape, which comprises a conductive substrate foil having a first surface directed towards the membrane electrode assembly (3) and said second surface directed away from the membrane electrode assembly, wherein said first surface is provided with an adhesive layer (9), and wherein optionally said second surface is provided with the second adhesive layer (15).

4. The electrochemical device according to claim 1, wherein the cathode current collector (2) is electrically connected to the cathode gas backing (8) by electrically conductive adhesive means (14).

5. The electrochemical device according to claim 1, wherein the cathode current collector comprises an electrically conductive mesh (202) and clamping means (219).

6. The electrochemical device according to claim 5, wherein the clamping means comprise a printed circuit board with one or more apertures for air access.

7. A multiple cell serial connection arrangement of electrochemical devices according to claim 1.

8. The multiple cell serial connection arrangement according to claim 7, comprising adjacent electrochemical devices that share a current collector element, said element functioning as a cathode current collector for one of said devices and as an anode current collector for the adjacent device.

9. The electrochemical device component according to claim 1, wherein said membrane electrode assembly (3) is attached to the cathode current collector (2) by adhesive means (14), and wherein at least a portion (14*a*) of the adhesive adjacent to the cathode gas backing (8) is electrically conductive.

10. The electrochemical device component according to claim 1, wherein the cathode current collector comprises an electrically conductive mesh (202) and clamping means (219).

11. The electrochemical device component according to claim 10, wherein the clamping means comprise a printed circuit board with one or more apertures for air access.

* * * * *